United States Patent
Torii

(10) Patent No.: US 10,417,783 B2
(45) Date of Patent: Sep. 17, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Satoru Torii, Fuchu (JP)

(73) Assignee: CANON KABUSHIKI KAISHA, Tokyo (JP)

(*) Notice: Subject to any disclaimer, the term of this patent is extended or adjusted under 35 U.S.C. 154(b) by 99 days.

(21) Appl. No.: 15/683,021

(22) Filed: Aug. 22, 2017

(65) Prior Publication Data

US 2018/0061079 A1 Mar. 1, 2018

(30) Foreign Application Priority Data

Aug. 23, 2016 (JP) .................. 2016-162808

(51) Int. Cl.
| | |
|---|---|
| *G06K 9/00* | (2006.01) |
| *G06T 7/73* | (2017.01) |
| *H04N 5/247* | (2006.01) |
| *G06T 7/579* | (2017.01) |
| *G06T 7/593* | (2017.01) |
| *H04N 13/243* | (2018.01) |
| *H04N 13/128* | (2018.01) |
| *H04N 13/00* | (2018.01) |

(52) U.S. Cl.
CPC ............ *G06T 7/74* (2017.01); *G06T 7/579* (2017.01); *G06T 7/596* (2017.01); *H04N 5/247* (2013.01); *H04N 13/128* (2018.05); *H04N 13/243* (2018.05); *G06T 2207/10028* (2013.01); *G06T 2207/20021* (2013.01); *H04N 2013/0081* (2013.01)

(58) Field of Classification Search
None
See application file for complete search history.

(56) References Cited

U.S. PATENT DOCUMENTS

| | | | | |
|---|---|---|---|---|
| 5,432,712 A | * | 7/1995 | Chan ................ | G01C 11/06 382/191 |
| 5,818,959 A | * | 10/1998 | Webb ............... | H04N 13/243 382/154 |
| 10,008,027 B1 | * | 6/2018 | Baker .............. | G06T 7/0051 |
| 2004/0022431 A1 | * | 2/2004 | Beardsley ........ | G06K 9/32 382/154 |
| 2008/0172384 A1 | * | 7/2008 | Cai ................. | G06T 7/238 |

(Continued)

FOREIGN PATENT DOCUMENTS

| | | |
|---|---|---|
| JP | 2011-171858 A | 9/2011 |
| JP | 2015-022630 A | 2/2015 |

*Primary Examiner* — Shervin K Nakhjavan
(74) *Attorney, Agent, or Firm* — Carter, DeLuca & Farrell LLP

(57) ABSTRACT

An image processing apparatus that calculates three-dimensional information on a subject by a corresponding point search by taking one of three or more disparity images including the common subject to be a base image and one of the disparity images other than the base image to be a reference image, and includes: a search unit configured to search corresponding points base on an evaluation value in relation to a luminance gradient on an epi-polar line in each of the disparity images other the base image.

10 Claims, 10 Drawing Sheets

(56) References Cited

U.S. PATENT DOCUMENTS

| | | | | |
|---|---|---|---|---|
| 2010/0128974 | A1* | 5/2010 | Koizumi | G06T 7/593 382/154 |
| 2011/0007072 | A1* | 1/2011 | Khan | G06T 17/00 345/420 |
| 2011/0235897 | A1* | 9/2011 | Watanabe | G06K 9/00214 382/154 |
| 2013/0141546 | A1* | 6/2013 | Asatani | H04N 13/243 348/48 |
| 2016/0042242 | A1* | 2/2016 | Segawa | G06T 7/593 382/103 |
| 2016/0198138 | A1* | 7/2016 | Wu | H04N 5/247 348/47 |
| 2017/0171525 | A1* | 6/2017 | Koehle | H04N 13/239 |
| 2017/0278258 | A1* | 9/2017 | Kurz | G06T 7/593 |

* cited by examiner

# IMAGE PROCESSING APPARATUS, IMAGE PROCESSING METHOD, AND STORAGE MEDIUM

BACKGROUND OF THE INVENTION

Field of the Invention

The present invention relates to a technique to estimate three-dimensional information on a subject by a corresponding point search based on a disparity image including the common subject.

Description of the Related Art

Techniques exist that estimate the distance to a subject or the shape of a subject by a corresponding point search based on a disparity image including the common subject. These techniques use an algorithm to find disparity by searching for a corresponding point between disparity images by block matching and to estimate the distance to a subject based on the disparity. In the block matching, it is common to search for a corresponding point along a certain straight line in an image. At this time, in the case where a luminance gradient exists in the direction perpendicular to the search direction or in the case where an edge exists on a line or the like in parallel to the search direction, there is such a problem that a reduction in search accuracy of a corresponding point also causes a reduction in estimation accuracy of a distance.

Consequently, as a technique to reduce the influence of, such as a luminance gradient and an edge, the techniques described in Japanese Patent Laid-Open No. 2011-171858 and Japanese Patent Laid-Open No. 2015-22630 are known. In the image processing apparatus of Japanese Patent Laid-Open No. 2011-171858, a plurality of disparity images is obtained by capturing the image of a subject by a microlens array. For one of the images, block matching is performed in the horizontal direction and in the vertical direction in an image having disparity in the horizontal direction and in an image having disparity in the vertical direction, respectively, and the block matching results in which of the horizontal direction and the vertical direction are to be employed is determined in accordance with reliability for each area. Further, in the image processing apparatus of Japanese Patent Laid-Open No. 2015-22630, a set of images having disparity in the horizontal direction and in the vertical direction is obtained by capturing the image of a subject by a set camera. Then, by determining the edge direction on the subject, the distance is calculated by using a set of images having disparity in the direction different from the edge direction.

However, the techniques described in Japanese Patent Laid-Open No. 2011-171858 and Japanese Patent Laid-Open No. 2015-22630 premise the use of disparity images obtained by performing image capturing by a set camera and a lens, which have disparity in the horizontal direction and in the vertical direction. That is, the techniques are techniques to reduce the influence of, such as a luminance gradient and an edge, by determining to use which of a disparity image having disparity in the horizontal direction and a disparity image having disparity in the vertical direction. Because of this, there is such a problem that it is not possible to reduce the influence of, such as a luminance gradient and an edge, in the case where a plurality of cameras is set at arbitrary positions and in arbitrary attitudes.

SUMMARY OF THE INVENTION

The image processing apparatus according to the present invention is an image processing apparatus that calculates three-dimensional information on a subject by a corresponding point search by taking one of three or more disparity images including the common subject to be a base image and one of the disparity images other than the base image to be a reference image, and includes: a search unit configured to search corresponding points base on an evaluation value in relation to a luminance gradient on an epi-polar line in each of the disparity images other than the base image.

Further features of the present invention will become apparent from the following description of exemplary embodiments with reference to the attached drawings.

DESCRIPTION OF THE EMBODIMENTS

First Embodiment

Figure 1:
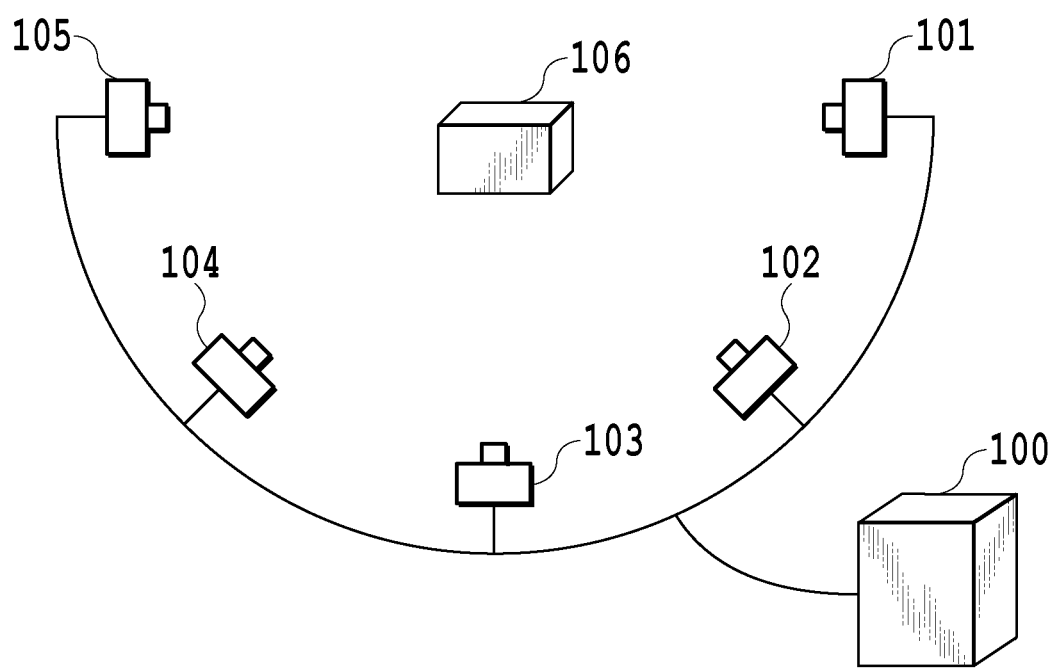
FIG. 1 is a diagram showing the way an image of a common subject is captured from a plurality of viewpoints in a first embodiment.

FIG. 1 is a diagram showing the way an image of a common subject is captured from a plurality of viewpoints in the present embodiment. As shown in FIG. 1, cameras 101 to 105 are arranged so as to surround a subject 106 at arbitrary positions and in arbitrary attitudes (with arbitrary viewpoints) different from one another. The cameras 101 to 105 acquire digital image data by receiving light information on a subject by a sensor and performing A/D conversion. The acquired digital image data is disparity image data including the common subject 106. In the present embodiment, explanation is given by taking the case where five cameras are used as an example, but the number of cameras is not limited to this and it is possible to use any number of cameras not less than three. Alternatively, it is also possible to acquire three or more pieces of disparity image data by capturing the image of the subject 106 from the three or more viewpoints by the same camera. The acquired disparity image data is transmitted to an image processing apparatus 100. In the present embodiment, the image processing apparatus 100 acquires the disparity image data of five images captured by the cameras 101 to 105 and calculates information on the distance to the subject and information on the shape of the subject based on the disparity image data.

Figure 2:
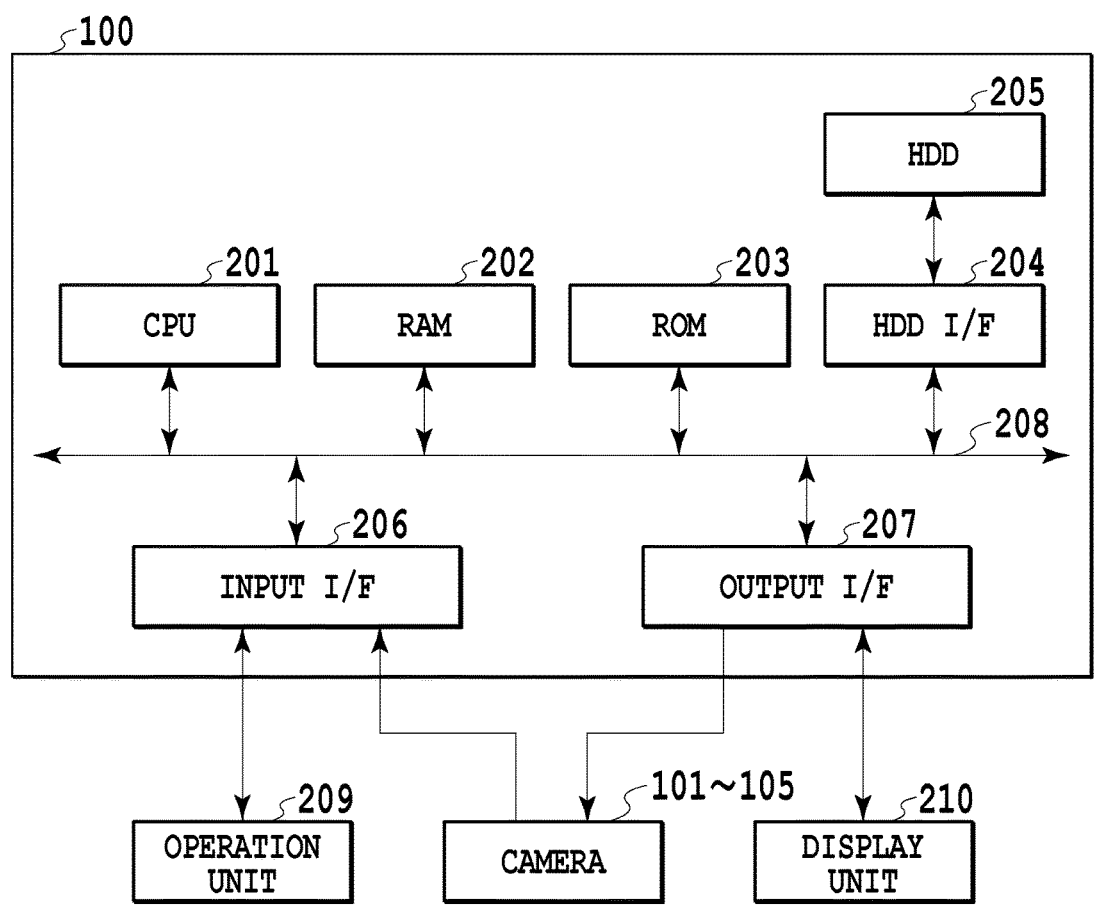
FIG. 2 is a block diagram showing an internal configuration of an image processing apparatus in the first embodiment.

FIG. 2 is a block diagram showing an internal configuration of the image processing apparatus 100 in the present embodiment. The image processing apparatus 100 has a CPU 201, a RAM 202, a ROM 203, an HDD I/F 204, an HDD 205, an input I/F 206, an output I/F 207, and a system bus 208.

The CPU 201 is a processor that controls each configuration unit of the image processing apparatus 100 and the RAM 202 and the ROM 203 are memories that store various kinds of data that are handled in the image processing apparatus 100, respectively. The CPU 201 executes programs stored in the ROM 203 by using the RAM 202 as a work memory and centralizedly controls each configuration unit of the image processing apparatus 100 via the system bus 208. Due to this, the various kinds of processing, to be described later, are performed.

The HDD I/F 204 is an interface, for example, such as a serial ATA (SATA), and connects the HDD 205 as a secondary storage device. It is possible for the CPU 201 to read data from the HDD 205 and write data to the HDD 205 via the HDD I/F 204. Further, it is possible for the CPU 201 to load data stored in the HDD 205 onto the RAM 202 and to similarly save the data loaded onto the RAM 202 in the HDD 205. Then, it is possible for the CPU 201 to regard the data loaded onto the RAM 202 as a program and to execute the program. As the secondary storage device, a storage device, such as an optical disc drive, may be used, in addition to the HDD.

The input I/F 206 is a serial bus interface, for example, such as USB and IEEE 1394. The CPU 201 acquires data from the cameras 101 to 105 and an operation unit 209 (e.g., mouse and keyboard) via the input I/F 206.

The output I/F 207 is a video output interface, for example, such as DVI and HDMI (registered trademark). It is possible for the CPU 201 to display captured images by the cameras 101 to 105 and a combined image obtained by performing some kind of processing for captured images on a display unit 210 (various output devices such as display). It may also be possible for a touch-panel display to function both as the operation unit 209 and as the display unit 210. There exist components of the image processing apparatus 100 other than those described above, but they are not the main purpose of the present invention, and therefore, explanation is omitted.

Next, processing to calculate distance information on the subject 106 from disparity images captured by the cameras 101 to 105 in the image processing apparatus 100 of the present embodiment is explained with reference to FIG. 3 and FIG. 4.

(Function Configuration of Image Processing Apparatus)

Figure 3:
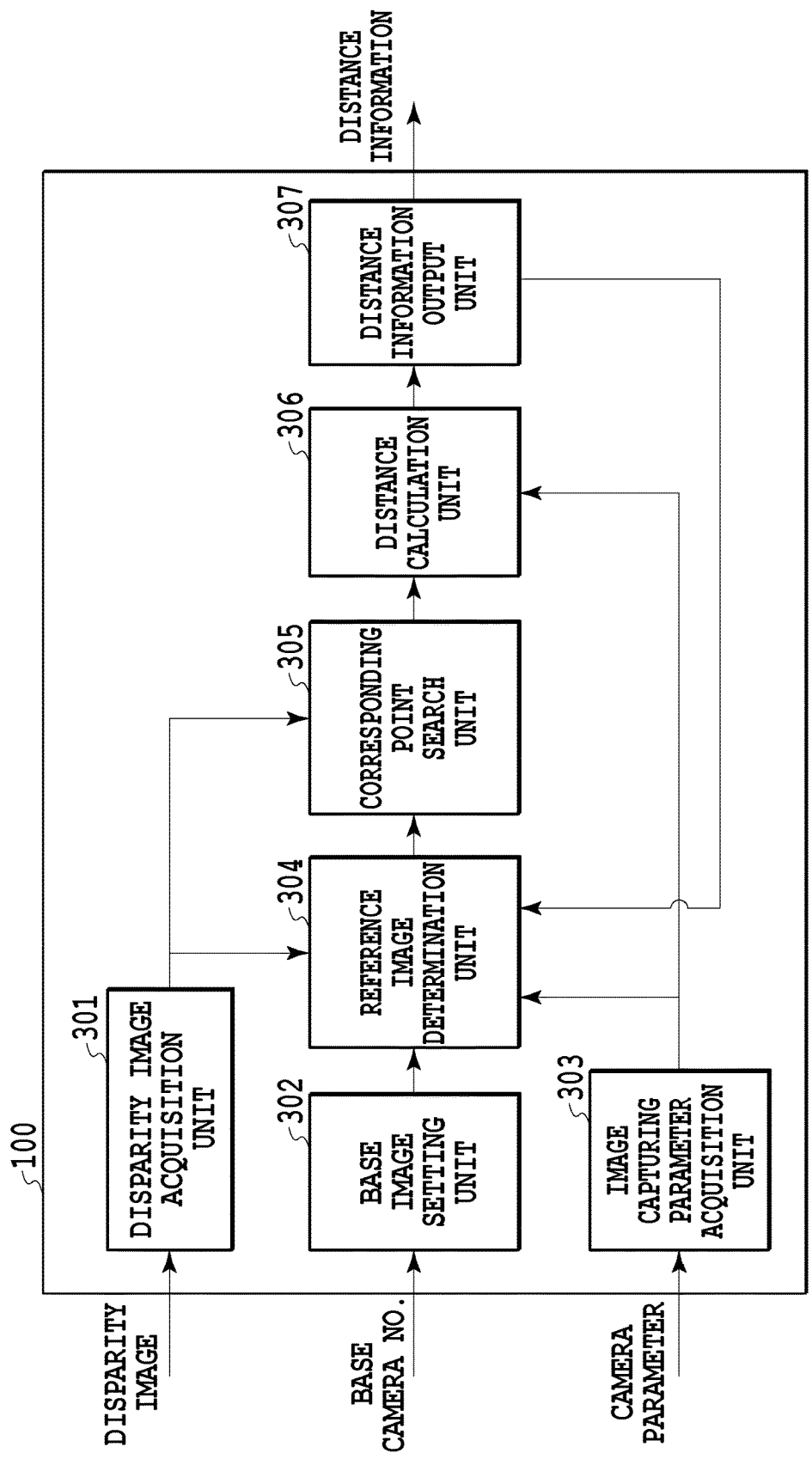
FIG. 3 is a block diagram showing a function configuration of the image processing apparatus in the first embodiment.

FIG. 3 is a block diagram showing a function configuration of the image processing apparatus 100 in the present embodiment. A disparity image acquisition unit 301 acquires five disparity images captured by the cameras 101 to 105 via the input I/F 206.

A base image setting unit 302 sets one of the five disparity images acquired by the disparity image acquisition unit 301 as a base image. The selection method of a base image may be any method and it may also be possible to select, for example, the captured image of the camera 103 arranged in the middle of the five cameras or for a user to make a selection via the operation unit 209.

Hereinafter, a camera that captures a base image is called a base camera. The image processing apparatus 100 in the present embodiment calculates the distance to a subject as three-dimensional information by taking the base camera as a base. In the present embodiment, in order to calculate three-dimensional information on a subject corresponding to each pixel of the base image, it is necessary to perform triangulation in correspondence to a disparity image captured by another camera. Hereinafter, an image captured by another camera, which is used to calculate three-dimensional information on a subject corresponding to each pixel of the base image, is called a reference image. A pixel of the base image, for which processing to calculate three-dimensional information on a subject is performed, is called a pixel of interest. In the present embodiment, one reference image is determined from the disparity images other than the base image for each pixel of the base image.

An image capturing parameter acquisition unit 303 acquires image capturing parameters corresponding to each disparity image acquired by the disparity image acquisition unit 301. In the present embodiment, image capturing parameters of the cameras 101 to 105 are acquired. Here, the image capturing parameters include external parameters representing the position and attitude of the camera and internal parameters representing the focal length, main point position, and distortion of the camera, and details will be described later. In the present embodiment, a file in which values obtained by measuring parameters of each camera is stored in the HDD 205 in advance and the image capturing parameter acquisition unit 303 acquires the image capturing parameters of each camera by reading data from the HDD 205 via the HDD I/F 204. Further, the image capturing parameter acquisition unit 303 extracts a natural feature point from the disparity image acquired by the disparity image acquisition unit 301 and calculates the image capturing parameters of the camera by using Structure from Motion.

A reference image determination unit 304 calculates an evaluation value relating to the magnitude of the luminance gradient on a straight line (epi-polar line), on which a corresponding point search is performed, for each disparity image other than the base image and determines a reference image from the disparity images other than the base image based on the calculated evaluation value.

A corresponding point search unit 305 searches for a pixel corresponding to the pixel of interest of the base image from the reference image determined by the reference image determination unit 304. A distance calculation unit 306 calculates the distance from the base camera to a subject by triangulation based on the two-dimensional coordinates of the pixel of interest in the captured image of the base camera, the two-dimensional coordinates of the corresponding point in the captured image of the reference camera, and the image capturing parameters of the base camera and the reference camera. In the present embodiment, an example is explained in which the distance from the base camera to a subject is calculated as three-dimensional information on a subject, but this is not limited. For example, also in the case where disparity and the three-dimensional shape of a subject are calculated, it is possible to apply the present embodiment similarly.

A distance information output unit 307 outputs the distance to a subject calculated for all the pixels of the base image to the display unit 210 via the output I/F 207, saves the distance in the HDD 205 through the HDD I/F 204, and so on.

(Processing Flow of Image Processing Apparatus)

Figure 4:
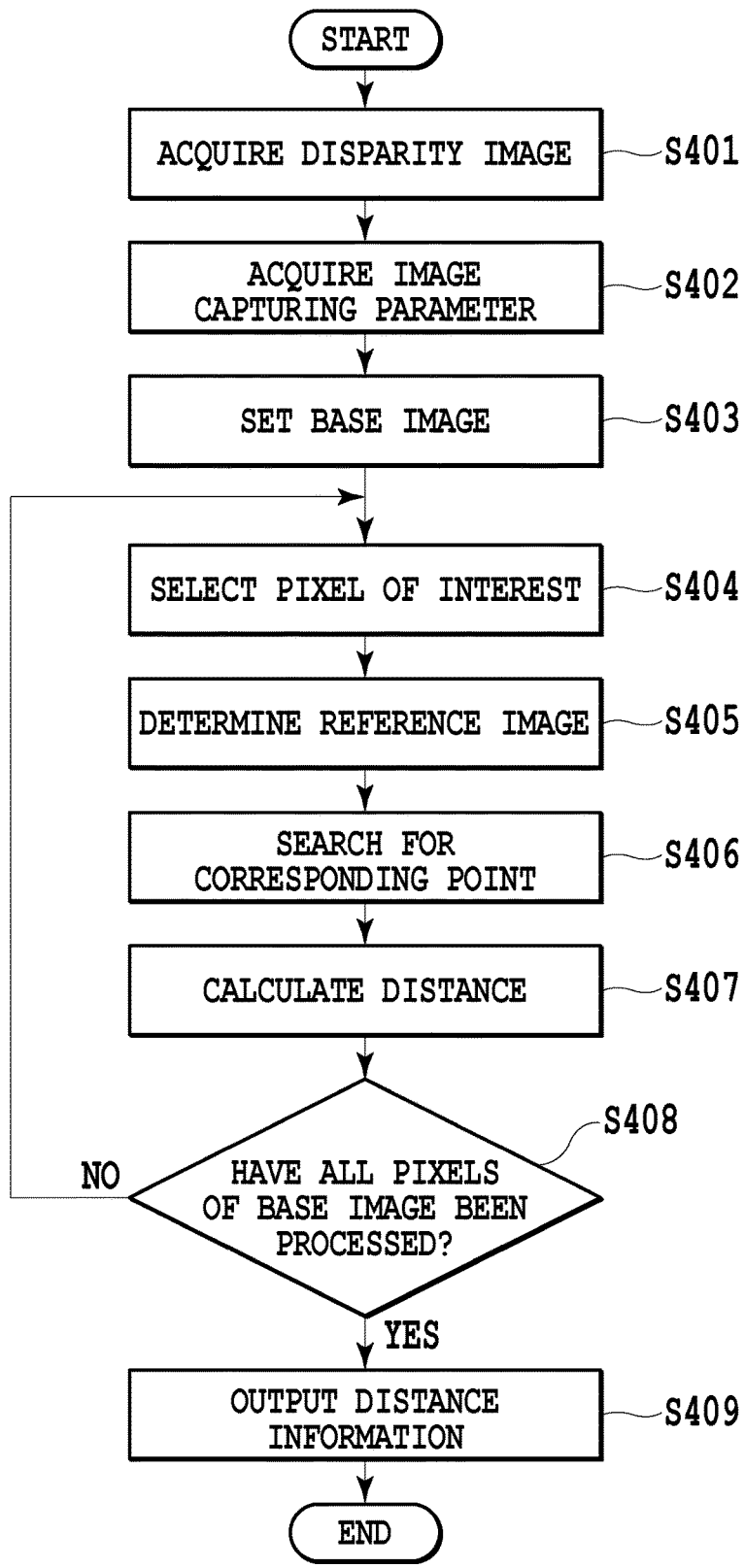
FIG. 4 is a diagram showing a processing flow of the image processing apparatus in the first embodiment.

FIG. 4 is a diagram showing a processing flow of the image processing apparatus 100 in the present embodiment. The image processing apparatus 100 calculates and outputs distance information on a subject based on a disparity image. At step S401, the disparity image acquisition unit 301 acquires a disparity image obtained by capturing the image of the common subject 106 by each of the cameras 101 to 105.

At step S402, the image capturing parameter acquisition unit 303 acquires the image capturing parameters for each of the cameras 101 to 105. As described previously, the image capturing parameters include the external parameters representing the position and attitude of the camera and the internal parameters representing the focal length and main point position of the camera. In the following, details of the image capturing parameters are explained.

(Image Capturing Parameter)

It is possible to represent the internal parameters as a 3×3 matrix A shown in expression (1) below. Here, the focal length in the x-direction is taken to be $f_x$, the focal length in the y-direction to be $f_y$, and the main point position to be ($c_x$, $c_y$).

$$A = \begin{bmatrix} f_x & 0 & c_x \\ 0 & f_y & c_y \\ 0 & 0 & 1 \end{bmatrix} \quad \text{expression (1)}$$

It is possible to represent the external parameters as a 4×3 matrix [R|T] consisting of a 3×3 rotation matrix R representing the attitude and a 3×1 translation matrix T representing the position. The external parameters are not limited to this matrix and may be in any form of representation as long as capable of representing the position and attitude of each camera.

In the following, explanation is given by taking the internal parameters to be $A_i$, the rotation matrix of the external parameters to be $R_i$, and the translation vector of the external parameters to be $T_i$ for the ith camera (i is an integer between 1 and 5, corresponding to each of the cameras 101 to 105). By using the internal parameters $A_i$ and the external parameters $R_i$ and $T_i$, it is possible to express a relationship between two-dimensional coordinates ($u_i$, $v_i$) of a pixel in the image captured by the ith camera and three-dimensional coordinates (X, Y, Z) of a point in a three-dimensional space, which corresponds to the pixel, by expression (2) below. Here, $\omega_i$ is a scale factor.

$$\omega_i \begin{bmatrix} u_i \\ v_i \\ 1 \end{bmatrix} = A_i [R_i | T_i] \begin{bmatrix} X \\ Y \\ Z \\ 1 \end{bmatrix} \quad \text{expression (2)}$$

This indicates that the point whose three-dimensional coordinates are (X, Y, Z) is recorded at the two-dimensional coordinates ($u_i$, $v_i$) in the captured image in the case where the image of the point is captured by the camera. By using the above-described external parameters $R_i$ and $T_i$, it is possible to calculate three-dimensional coordinates ($X_{ci}$, $Y_{ci}$, $Z_{ci}$) of the camera by expression (3) below.

$$\begin{bmatrix} X_{ci} \\ Y_{ci} \\ Z_{ci} \end{bmatrix} = -R_i^T \cdot T_i \quad \text{expression (3)}$$

Next, at step S403, the base image setting unit 302 sets one of the disparity images acquired at step S401 as a base image. In the processing at the next step S404 to step S408, three-dimensional information on a corresponding subject is calculated for all the pixels of the base image.

At step S404, from among unprocessed pixels in the base image, arbitrary one pixel is selected as a pixel of interest. The pixel of interest selected at this step becomes the target of the processing at the next step S405 to step S407. It may also be possible to select the pixel of interest in any order. For example, it may also be possible to select the pixel at the top-left end in the image at first, and then, to select up to the pixel at the bottom-right end in order by a raster scan.

At step S405, the reference image determination unit 304 determines one reference image for the pixel of interest among the disparity images other than the base image. For each disparity image other than the base image, an epi-polar line of the pixel of interest of the base image in the disparity image is calculated and an evaluation value representing reliability in the case where a search of a corresponding point of the pixel of interest is performed for the calculated epi-polar line is calculated. A reference image is determined by comparing the calculated evaluation values. Details of reference image determination processing based on the epi-polar line will be described later. It is sufficient for the present processing to be capable of determining one reference image for the pixel of interest, and it may also be possible to select a reference image based on the epi-polar line for each pixel of interest or to select a reference image for a block including the pixel of interest and a plurality of pixels on the periphery and to use a reference image common within the block.

At step S406, the corresponding point search unit 305 searches for a corresponding point of the pixel of interest from the reference image determined at step S405. In the present embodiment, a corresponding point of the pixel of interest is searched for from the pixels located on the epi-polar line corresponding to the pixel of interest of the base image of the reference image. The range in which a corresponding point is searched for in the reference image is not limited to the entire epi-polar line, and it is also possible to search for a corresponding point from a search range determined by a search range determination unit 503, to be described later.

As a method of searching for a corresponding point, for example, it is possible to use block matching. That is, the degree of difference between a block consisting of the pixel of interest of the base image and adjacent pixels thereof and a block on the reference image, which is set with the same size, is calculated. Then, a corresponding point of the pixel of interest is searched for by calculating the degree of difference while sequentially moving the position of the block on the reference image in the above-described search range and by finding the position of the block at which the degree of difference becomes the lowest. At this time, for the calculation of the degree of difference between the blocks, it is possible to use, for example, SSD (Sum of Squared Difference) expressed by expression (4) below.

$$SSD = \sum_{i=-N/2}^{N/2} \sum_{j=-M/2}^{M/2} (I_{main}(u_o + j, v_o + i) - I_{sub}(u + j, v + i))^2 \quad \text{expression (4)}$$

Here, $I_{main}$ represents the pixel value of the base image and $I_{sub}$ represents the pixel value of the reference image. It is assumed that the block on the base image is a block of M×N pixels with the pixel of interest whose coordinates are $(u_0, v_0)$ as a center. It is also assumed that the block on the reference image is a block of M×N pixels whose center coordinates are (u, v). By sequentially moving the block on the reference image in the search range, SSD is calculated by expression (4) described above. The coordinates of the corresponding point of the pixel of interest are (u, v) in the case where the calculated SSD is the lowest. In the following, (u, v) in the case where SSD becomes the lowest, i.e., the coordinates of the corresponding point on the reference image are described as $(u_m, v_m)$.

In the above-described example, as the degree of difference, SSD is used, but it is also possible to user another index, such as SAD (Sum of Absolute Difference). Further, in place of the degree of difference, it is also possible to use the degree of similarity, such as the normalized cross-correlation, as an index. In this case, a corresponding point of the pixel of interest is searched for by finding the position of the block at which the degree of similarity becomes the highest. The search method of a corresponding point is not limited to block matching and another search method may also be used.

Next, at step S407, the distance calculation unit 306 calculates the distance to a subject by using the coordinates $(u_0, v_0)$ of the pixel of interest on the base image, the coordinates $(u_m, v_m)$ of the corresponding point on the reference image obtained at step S406, and the image capturing parameters corresponding to the base image and the reference image. First, it is possible to calculate three-dimensional coordinates of the point on the subject corresponding to the pixel of interest based on triangulation as follows. That is, in the case where the internal parameters are taken to be $A_m$ and the external parameters to be $R_m$ and $T_m$ for the base camera, from expression (2), expression (5) below holds.

$$\omega_m \begin{bmatrix} u_o \\ v_o \\ 1 \end{bmatrix} = A_m [R_m | T_m] \begin{bmatrix} X \\ Y \\ Z \\ 1 \end{bmatrix} \quad \text{expression (5)}$$

Similarly, in the case where the internal parameters are taken to be $A_s$ and the external parameters to be $R_s$ and $T_s$ for the camera that has captured the reference image, from expression (2), expression (6) below holds.

$$\omega_s \begin{bmatrix} u_m \\ v_m \\ 1 \end{bmatrix} = A_s [R_s | T_s] \begin{bmatrix} X \\ Y \\ Z \\ 1 \end{bmatrix} \quad \text{expression (6)}$$

The above-described expression (5) and expression (6) are each simultaneous equations in five unknowns $\omega_m$, $\omega_s$, X, Y, and Z, and X, Y, and Z that will be obtained by solving the simultaneous equations are three-dimensional coordinates of a point on the subject corresponding to the pixel of interest. Then, by comparing the obtained three-dimensional coordinates of the subject and the three-dimensional coordinates of the base camera, which can be calculated by expression (3), it is possible to calculate the distance to the subject.

Next, at step S408, whether or not the processing at step S405 to step S407 has been performed for all the pixels of the base image is determined. In the case where it is determined that the processing has been performed for all the pixels, the processing advances to step 409. On the other hand, in the case where it is determined that the processing has not been performed for all the pixels and an unprocessed pixel remains, the processing advances to step S406.

At step S409, the distance information output unit 307 outputs the distance to the subject calculated at step S407 to the display unit 210 via the output I/F 207, stores the distance in the HDD 205 via the HDD I/F 204, and so on. By the above, the flow of the processing to calculate the distance information on the subject 106 in the image processing apparatus 100 is completed.

(Details of Reference Image Determination Processing)

Figure 5:
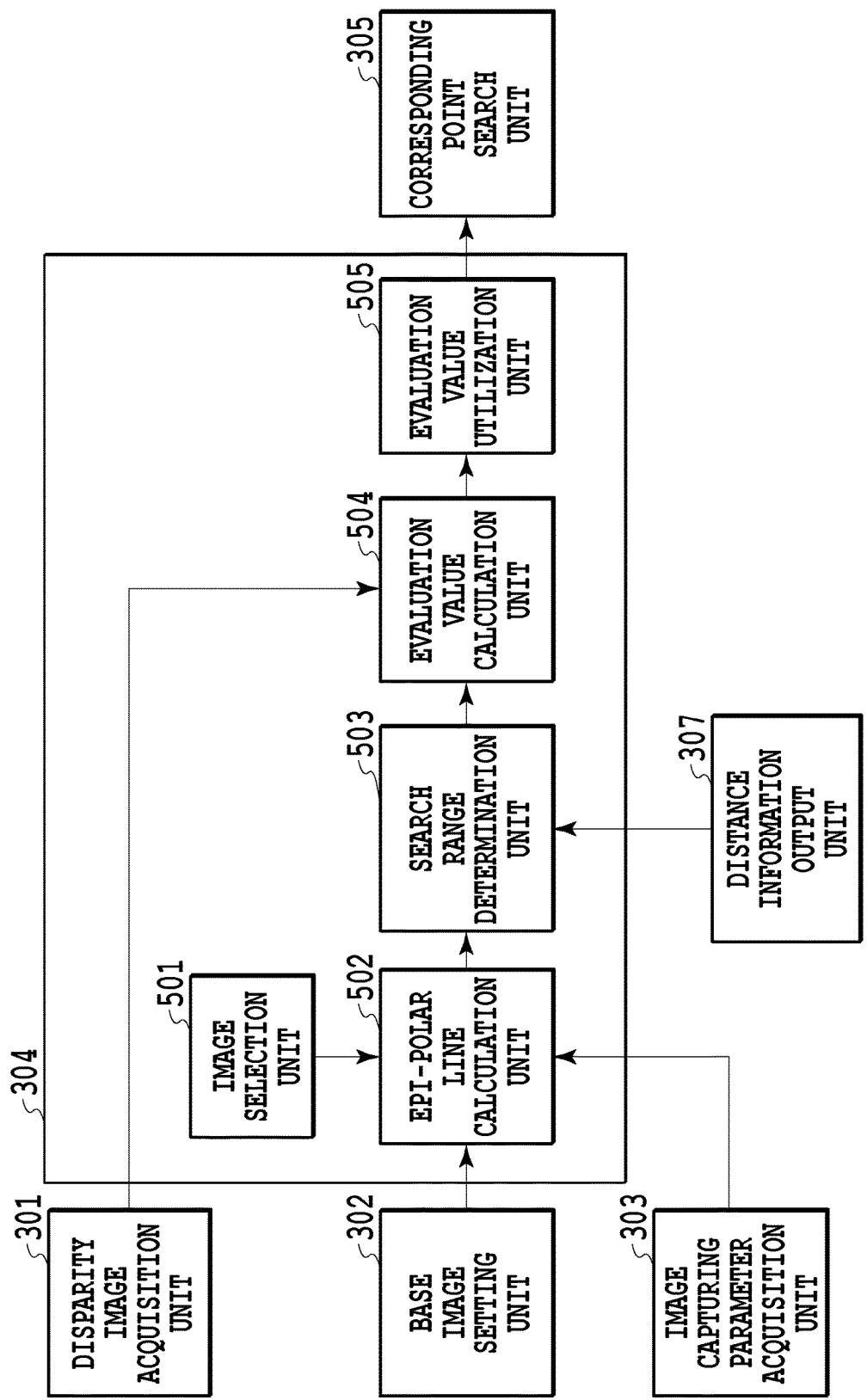
FIG. 5 is a block diagram showing a function configuration of a reference image determination unit in the first embodiment.

Following the above, details of the reference image determination processing performed by the reference image determination unit 304 at step S405 are explained. FIG. 5 is a block diagram showing a function configuration of the reference image determination unit 304 in the present embodiment. The reference image determination unit 304 includes an image selection unit 501, an epi-polar line calculation unit 502, the search range determination unit 503, an evaluation value calculation unit 504, and an evaluation value utilization unit 505.

The image selection unit 501 selects one disparity image from among the disparity images other than the base image as an evaluation-target image. In the present embodiment, the processing by the epi-polar line calculation unit 502, the search range determination unit 503, and the evaluation value calculation unit 504 is performed for all the disparity images other than the base image, and therefore, it may be possible for the image selection unit 501 to select unprocessed disparity images one by one from among the disparity images other than the base image. It may also be possible to select an unprocessed disparity image in any order.

The epi-polar line calculation unit 502 calculates an epi-polar line corresponding to the pixel of interest of the base image in the evaluation-target image. The search range determination unit 503 determines a search range of the corresponding point in the evaluation-target image for the pixel of interest of the base image based on the epi-polar line corresponding to the pixel of interest and the distance calculation results of the adjacent pixels for which the processing has already been performed. The evaluation value calculation unit 504 calculates an evaluation value relating to the magnitude of the luminance gradient within the search range in the evaluation-target image. In the present embodiment, the average value of the absolute value of the luminance gradient within the search range is calculated as an evaluation value. The calculated evaluation value indicates that the larger the value, the higher the reliability is in the case where the corresponding point of the pixel of interest of the base image is searched for from the evaluation-target image.

The evaluation value utilization unit 505 compares the evaluation values calculated for each disparity image other than the base image and determines the reference image. In the present embodiment, the disparity image whose evaluation value is the largest among the disparity images other than the base image is determined to be the reference image.

Figure 6:
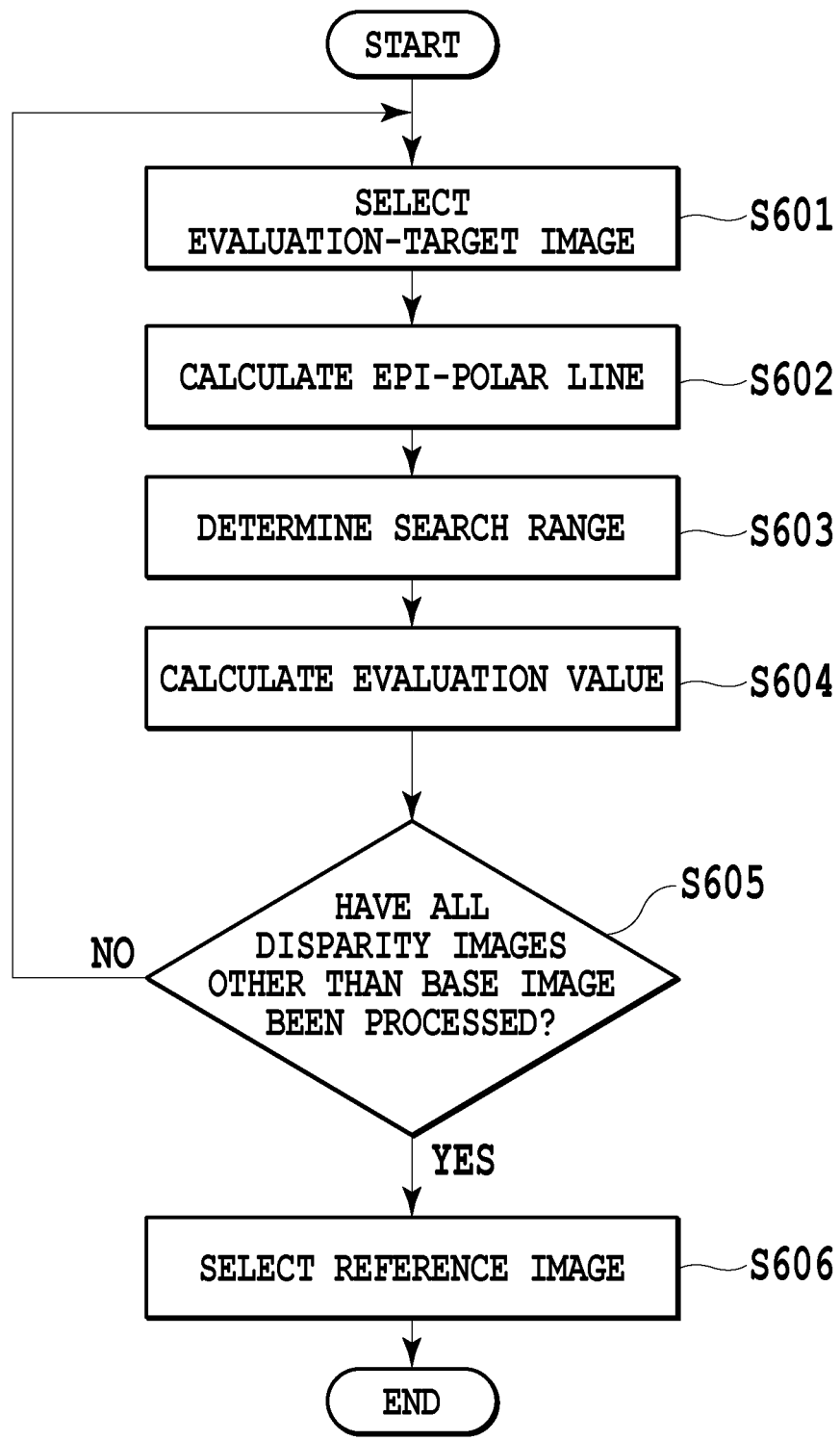
FIG. 6 is a diagram showing a processing flow of the reference image determination unit in the first embodiment.

FIG. 6 is a diagram showing a processing flow of the reference image determination unit 304 in the present embodiment. At step S601, from among the disparity images other than the base image, one unprocessed disparity image is selected as an evaluation-target image. The evaluation-target image selected at this step becomes the target of the processing at step S602 to step S604.

At step S602, the epi-polar line calculation unit 502 calculates the epi-polar line in the evaluation-target image from the image capturing parameters corresponding to the base image and the evaluation-target image and the coordinates of the pixel of interest on the base image.

(Calculation of Epi-Polar Line)

Figure 7:
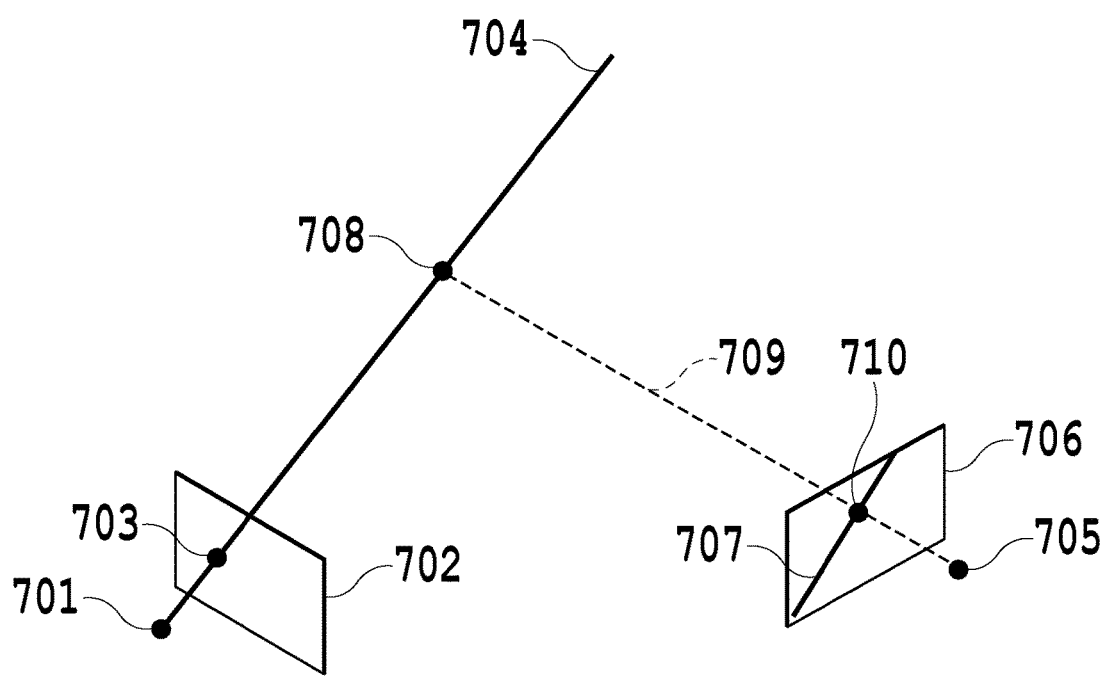
FIG. 7 is a schematic diagram for explaining an epi-polar line.

FIG. 7 is a diagram for explaining the epi-polar line. A camera 701 represents the camera that has captured the base image of the cameras 101 to 105 and a camera 705 represents the camera that has captured the evaluation-target image of the cameras 101 to 105. The base image captured by the camera 701 and displayed virtually in the three-dimensional space is represented by an image 702. The reference image captured by the camera 705 and displayed virtually in the three-dimensional space is represented by an image 706. Further, for a pixel of interest 703 on the image 702, a point corresponding to the pixel of interest 703 is searched for from the image 706. A straight line 704 is an extension line of the straight line connecting the camera 701 and the pixel of interest 703. The pixel of interest 703 on the image 702 should exist at a position on the straight line 704 on the three-dimensional space. The straight line 704 projected onto the image 706 is a straight line 707 on the image 706. This straight line 707 is the epi-polar line.

The epi-polar line 707 has the following nature. That is, the nature is that, in the case where a straight line 709 connecting an arbitrary point on the straight line 704, e.g., a point 708, and the camera 705 is considered, an intersection 710 of the straight line 709 and the reference image 706 is situated on the epi-polar line 707. It is possible to calculate the epi-polar line in the evaluation-target image from the coordinates of the pixel of interest of the base image and the image capturing parameters of the base camera that has captured the base image and the camera that has captured the evaluation-target image.

First, the internal parameters of the base camera that has captured the base image are taken to be $A_m$, the rotation matrix to be $R_m$, and the translation vector to be $T_m$, and the internal parameters of the camera that has captured the evaluation-target image is taken to be $A_o$, the rotation matrix to be $R_o$, and the translation vector to be $T_o$. By expression (7) below, $R_{mo}$ and $T_{mo}$ are calculated. Here, $T_{mo}$ is called a skew-symmetric matrix of t.

$$R_{mo} = R_m^T R_o$$
$$t = (t_x, t_y, t_x)^T = R_m^T(T_o - T_m)$$
$$T_{mo} = \begin{pmatrix} 0 & -t_z & t_y \\ t_z & 0 & -t_x \\ -t_y & t_x & 0 \end{pmatrix}$$

expression (7)

Then, by using $R_{mo}$ and $T_{mo}$ described above, a fundamental matrix F is calculated from expression (8) below.

$$F = A_m^{-T} T_{mo} R_{mo} A_o^{-1}$$

expression (8)

Further, it is possible to express the epi-polar line by expression (9) below by using the coordinate system u, v on the evaluation-target image from the above-described fundamental matrix F and the coordinates $(u_o, v_o)$ of the pixel of interest on the base image.

$$au + bv + c = 0$$

expression (9)

$$(a, b, c) = \begin{pmatrix} u_o \\ v_o \\ 1 \end{pmatrix}^T F$$

Next, at step S603, the search range determination unit 503 determines a range of the evaluation-target image, in which a pixel that corresponds to the pixel of interest of the base image is searched for. This is to limit an area in which a search is made in the evaluation-target image in order to reduce the calculation cost of the search of a corresponding point of the pixel of interest of the base image. In general, a search range is set onto the epi-polar line calculated at step S602, but in the present embodiment, the search range is further limited to a small one based on the corresponding point search results (distance calculation results) for the adjacent pixel for which the processing has already been performed, in addition to limiting the search range onto the epi-polar line.

(Determination of Search Range)

Figure 8:
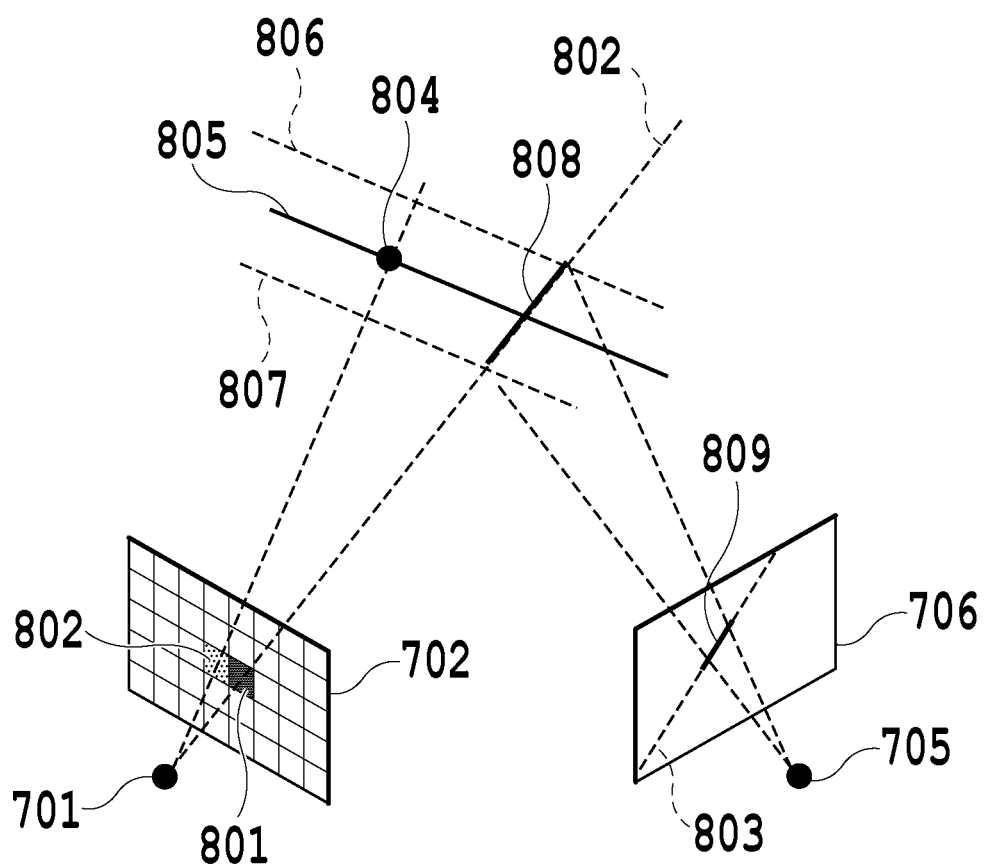
FIG. 8 is a diagram for explaining a determination method of a corresponding search range in the first embodiment.

FIG. 8 is a diagram for explaining a determination method of a search range in the present embodiment. For the pixel of interest in the image 702 captured by the camera 701, the corresponding point of the pixel of interest is searched for in the image 706 captured by the camera 705. A pixel 801 represents the pixel of interest in the image 702 captured by the camera 701. A straight line 802 is a straight line that connects the camera 701 and the pixel of interest 801. A straight line 803 in the image 706 captured by the camera 705 is the epi-polar line.

In order to further limit the search range, a pixel 802 adjacent to the pixel of interest 801, for which the processing has already been performed, is considered. It is assumed that the pixel 802 is calculated by the processing at step S407 described previously on the assumption that the corresponding point on the subject is a point 804 in the three-dimensional space. Then, the search range is limited by assuming that the surface of the subject is smooth and the change in the distance to the subject is not so large in the adjacent pixel. Specifically, a plane that includes the point 804 and which is parallel to the image 702 is taken to be a plane 805 and a plane 806 and a plane 807 apart by a distance D from the plane 805 being sandwiched in between are supposed. Then, a segment 809 obtained by projecting the area (in FIG. 8, a segment 808 drawn by the solid line) of the straight line 802, which is sandwiched by the plane 806 and the plane 807, onto the image 706 is determined to be the search range.

Here, explanation is given by taking the case as an example where the pixel 802 on the left of the pixel of interest is made use of as the adjacent pixel, but the adjacent pixel is not limited to this and it may also be possible to use another pixel for which the processing has already been performed. Further, it may also be possible to make use of a plurality of adjacent pixels. As the distance D between the plane 805 and the plane 806 and between plane 805 and the plane 807, it may also be possible to use a constant value that does not change during the entire processing, and the distance D may change in proportion to the amount of change in the distance calculated for a plurality of adjacent pixels for which the processing has already been performed. Further, as the amount of change in the distance calculated for a plurality of adjacent pixels for which the processing has already been performed, it is possible to use, for example, the value of a variance, a differential (difference), and so on.

Next, at step S604, the evaluation value calculation unit 504 calculates an average value of the absolute value of the luminance gradient within the search range relating to the evaluation-target image as an evaluation value. It is possible to calculate an evaluation value E by expression (10) below.

$$E = \frac{\sum_{u \in s}\left(\left|I\left(u, -\frac{a}{b}u - \frac{c}{b}\right) - I\left(u-1, -\frac{a}{b}(u-1) - \frac{c}{b}\right)\right|\right)}{\sum_{u \in s} 1} \quad \text{expression (10)}$$

Here, a, b, and c represent coefficients of an equation of the straight line of the epi-polar line calculated by expression (9) and I (u, v) represents the luminance value of the evaluation-target image at the coordinates (u, v). Further, S represents the search range determined at step S603.

Next, at step S605, whether or not the processing at step S601 to step S604 described above has been performed for all the disparity images other than the base image is determined. In the case where it is determined that the processing has been performed for all the disparity images, the processing advances to step S606. In the case where there remains an unprocessed disparity image, the processing advances to step S601.

At step S606, the evaluation value utilization unit 505 compares the evaluation values calculated for each of the disparity images other than the base image and determines the disparity image whose evaluation value is the largest to be a reference image. By the above, it is possible to select a reference image for each pixel of interest based on the epi-polar line. In the case where a reference image is selected for a block consisting of the pixel of interest and a plurality of pixels on the periphery thereof, it is possible to perform the above-described reference image determination processing for all the pixels within the block and to select the image that appears most frequently as the reference image of the block.

(Effects of the Present Embodiment)

In the following, effects obtained by the present embodiment are explained. In the conventional distance estimation technique, by searching for the pixel from the pixels on the epi-polar line of the reference image, whose degree of difference from the pixel of interest becomes the lowest, the corresponding point of the pixel of interest of the based image is searched for. However, in the case where the change in luminance is small on the epi-polar line of the reference image, the change in the degree of difference between pixels on the epi-polar line is small. Because of this, in the case where an error occurs in the calculated degree of difference due to, for example, noise and the like included in the image, there is a possibility that the degree of difference becomes the lowest at a position different from the originally corresponding pixel and the pixel is erroneously searched for as the corresponding point.

Figure 9A:
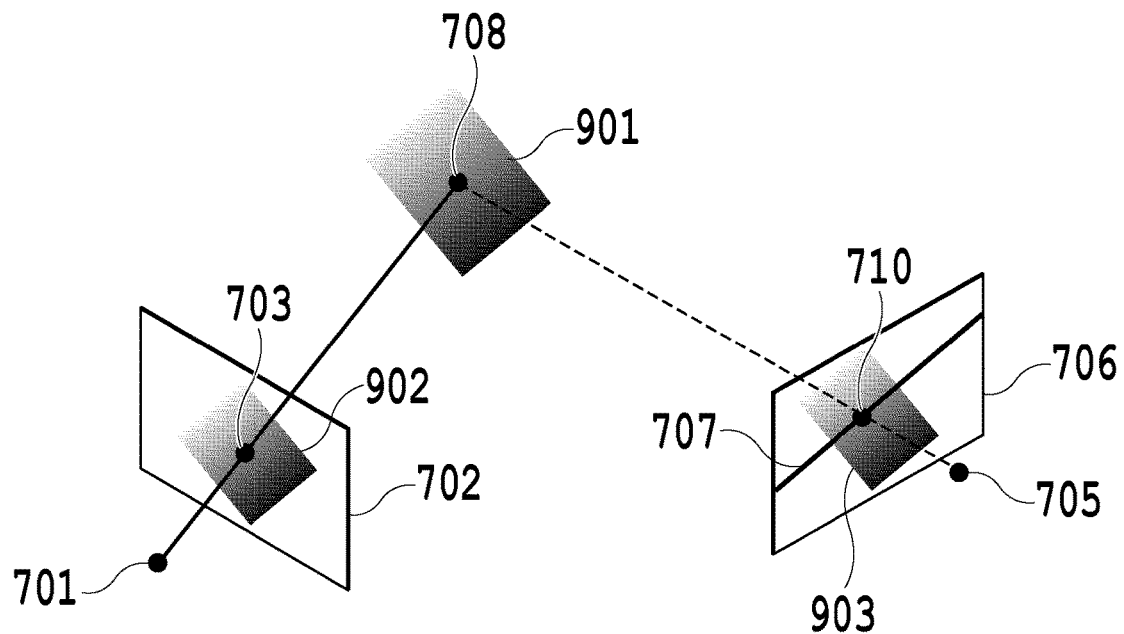
FIGS. 9A and 9B are diagrams showing a case where a corresponding point search by a conventional distance estimation technique is performed.
Figure 9B:
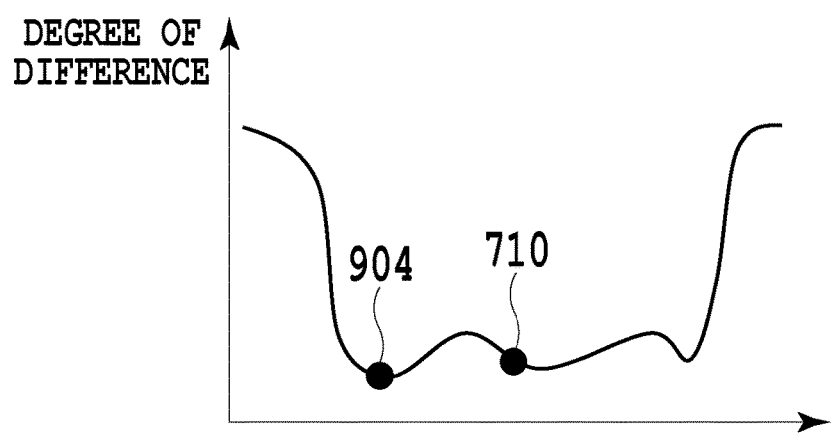

FIG. 9A and FIG. 9B are diagrams showing the case where a corresponding point search is performed by the conventional distance estimation technique. FIG. 9A and FIG. 9B show an example of the case where the change in luminance is small on the epi-polar line of the reference image. FIG. 9A shows the way the image of a subject 901 is captured by the two cameras, i.e., the camera 701 and the camera 705. It is assumed that the image of the subject 901 is captured like an area 902 in the image 702 captured by the camera 701 and like an area 903 in the image 706 captured by the camera 705. At this time, in the case where the distance of the point 708 on the subject 901, which corresponds to the pixel of interest 703 in the image 702, is estimated, it is necessary to search for the corresponding point 710 from the epi-polar line 707 of the image 706.

FIG. 9B schematically shows the degree of difference between the pixel of interest 703 and each pixel on the epi-polar line 707, which is calculated to search for a corresponding point. In the area 903 in the image 706, the change in luminance is small on the epi-polar line 707, and therefore, as in FIG. 9B, the change in the degree of difference between the point 710 and a pixel on the periphery thereof is small and an erroneous pixel 904 is searched for as a corresponding point.

On the other hand, according to the present embodiment, a plurality of disparity image is taken to be candidates of the reference image and the disparity image whose change in luminance on the epi-polar line is large is taken to be the reference image among the plurality of candidates, and therefore, the change in the degree of difference between pixels on the epi-polar line becomes large. Because of this, even in the case where noise is included in the image, it is made possible to search for a correct corresponding point.

Figure 10A:
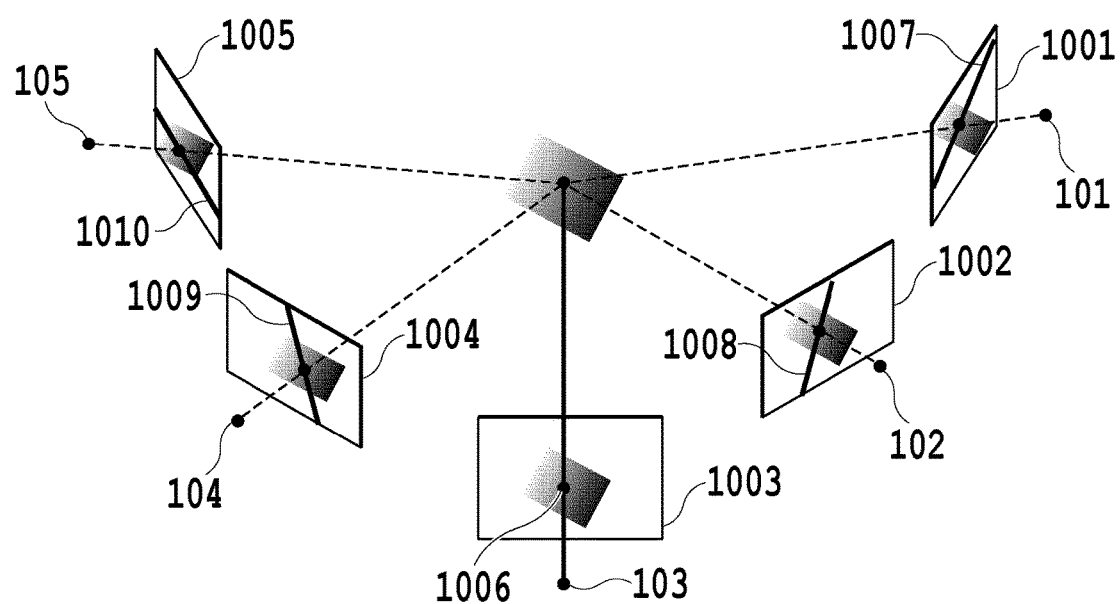
FIGS. 10A and 10B are diagrams for explaining effects of the first embodiment.
Figure 10B:
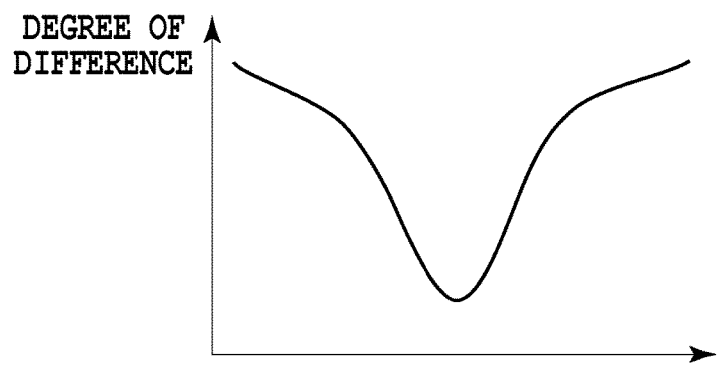

FIG. 10A and FIG. 10B are diagrams showing the case where the corresponding point search according to the present embodiment is performed. In FIG. 10A, captured images displayed on the three-dimensional space for the five cameras, i.e., the camera 101 to the camera 105, are image 1001 to image 1005, respectively. The image 1003 captured by the camera 103 is taken to be the base image and distance information on the subject corresponding to a pixel of interest 1006 in the base image 1003 is estimated. At this time, the epi-polar lines calculated for the images 1001, 1002, 1004, and 1005 are epi-polar lines 1007, 1008, 1009, and 1010, respectively. Then, the image (e.g., image 1005) whose change in the luminance value on each epi-polar line is the largest is selected as the reference image.

FIG. 10B schematically shows the degree of difference on the epi-polar line 1010 of the selected reference image 1005. In the reference image 1005, because the change in luminance is large on the epi-polar line 1010, the change in the degree of difference at the time of block matching becomes large and the degree of difference has a clear peak as shown in FIG. 10B, and therefore, it is made possible to search for a correct corresponding point.

In FIG. 10B, explanation is given by taking the case where the luminance changes gradually as an example, but also in the case where the change in luminance is steep, a so-called edge, the same effects can be obtained. Further, in the above, explanation is given by taking the case where the image of a subject is captured simultaneously by a plurality of cameras as shown in FIG. 1 as an example, but it is also possible to apply the present embodiment to the case where the image of a subject is captured by moving one camera held in hand relative to the subject.

As above, by the present embodiment, in the case where a plurality of cameras is set at arbitrary positions and in arbitrary attitudes and a disparity image is captured, it is possible to reduce the influence of the existence of a luminance gradation and an edge, such as a line, on the epi-polar line, and therefore, it is possible to highly accurately estimate a distance. In the above, the case is explained where the base camera is fixed during processing and the distance from the base camera to the subject is estimated, but it is also possible to apply the present invention to the case where the camera changes during processing.

Second Embodiment

In the first embodiment, an evaluation value relating to the magnitude of the luminance gradient within the search range is calculated and used for determination of the reference image, but in the present embodiment, an evaluation value relating to the direction of the luminance gradient within the search range is calculated and used for determination of the reference image. That is, in the present embodiment, the degree of similarity between the direction of the luminance gradient on the epi-polar line and the direction of the epi-polar line of an evaluation-target image is used as an evaluation value In the following, the operation of the image processing apparatus in the present embodiment is explained, but the portion that is different from the first embodiment is explained. The operation different from the first embodiment is the operation of the evaluation value calculation unit. The operation of each of the other units is the same as that of the first embodiment, and therefore, explanation is omitted.

The operation of an evaluation value calculation unit 504' in the present embodiment is explained. First, the evaluation value calculation unit 504' calculates the direction of the epi-polar line calculated by the epi-polar line calculation unit 502. Next, the evaluation value calculation unit 504' calculates an average value of the direction of the luminance gradient within the search range of the evaluation-target image based on the search range determined by the search range determination unit 503. Further, the evaluation value calculation unit 504' calculates the degree of similarity between the calculated average value of the direction of the luminance gradient within the search range and the direction of the epi-polar line as an evaluation value.

In the following, the processing flow of the evaluation value calculation unit 504' of the present embodiment is explained. In this processing flow, the evaluation value relating to the direction of the luminance gradient within the search range in each disparity image is calculated for the four disparity images other than the base image. As in the first embodiment, the evaluation value calculation unit 504' of the present embodiment performs the processing in accordance with the flowchart shown in FIG. 6, but the evaluation value calculation processing at step S604 is different. In the following, step S604' at which the evaluation value calculation processing in the present embodiment is performed is explained. The processing contents at the other steps are the same as those of the first embodiment, and therefore, explanation is omitted.

(Direction D of Epi-Polar Line)

First, the evaluation value calculation unit 504' calculates the direction of the epi-polar line calculated by the epi-polar line calculation unit 502. Here, the direction of the epi-polar line may be represented in any form and for example, it is possible to represent the direction by the angle formed by the horizontal axis (u-axis) in the image and the epi-polar line, and it is possible to represent the direction by a direction vector consisting of two components in the horizontal axis (u-axis) direction and the vertical axis (v-axis) direction of the image. In the following, the direction of the epi-polar line is represented by a direction vector. The epi-polar line can be expressed by expression (8) below, and therefore, it is possible to express a direction D of the epi-polar line as expression (11) below.

$$D = (b, -a)^T / \|(b, -a)\| \quad \text{expression (11)}$$

(Average Value G of Direction of Luminance Gradient)

Then, the evaluation value calculation unit 504' calculates the average value of the direction of the luminance gradient within the search range in the evaluation-target image based on the search range determined by the search range determination unit 503. Here, it is possible to express a direction G (u, v) of the luminance gradient in the pixel at the coordinates (u, v) of the image I as expression (12) below by using the differentials in the u-axis direction and in the v-axis direction.

$$G(u, v) = \frac{\left(\frac{\partial I(u, v)}{\partial u}, \frac{\partial I(u, v)}{\partial v}\right)^T}{\left\|\left(\frac{\partial I(u, v)}{\partial u}, \frac{\partial I(u, v)}{\partial v}\right)\right\|} \quad \text{expression (12)}$$

It is possible to calculate the differential in the u-axis direction in expression (12) by expression (13) below by using a mask $D_u$ (i, j).

$$\frac{\partial I(u, v)}{\partial u} = \sum_{i=-1}^{1} \sum_{j=-1}^{1} I(u+i, v+j) \times D_u(i+1, j+1) \quad \text{expression (13)}$$

As the mask $D_u$ (i, j), any differential mask may be used and it is possible to use, for example, the Previtt mask and the Sobel mask. In the case where the Previtt mask is used, it is possible to express the mask $D_u$ (i, j) by expression (14) below.

$$D_u(i, j) = \begin{pmatrix} -1 & 0 & 1 \\ -1 & 0 & 1 \\ -1 & 0 & 1 \end{pmatrix} \quad \text{expression (14)}$$

Similarly, it is possible to calculate the differential in the v-axis direction in expression (12) from expression (15) below by using the mask $D_u$ (i, j).

$$\frac{\partial I(u, v)}{\partial v} = \sum_{i=-1}^{1} \sum_{j=-1}^{1} I(u+i, v+j) \times D_v(i+1, j+1) \quad \text{expression (15)}$$

In the case where the Previtt mask is used, it is possible to express a mask $D_v$ (u, v) by expression (16) below.

$$D_v(i, j) = \begin{pmatrix} -1 & -1 & -1 \\ 0 & 0 & 0 \\ 1 & 1 & 1 \end{pmatrix} \quad \text{expression (16)}$$

Then, the average value of the direction of the luminance gradient in all the pixels included in the search range is calculated. The average value G of the direction of the luminance gradient is calculated by expression (17) below.

$$G = \frac{\sum_{u \in S} G(u, v)}{\sum_{u \in S} 1} \quad \text{expression (17)}$$

(Degree of Similarity of Direction)

Finally, the evaluation value calculation unit 504' calculates the degree of similarity between the average value G of the direction of the luminance gradient and the direction D of the epi-polar line by expression (18) below and takes the degree of similarity to be the evaluation value E. At this time, the degree of similarity of direction is set to a real number not less than 0 and not more than 1 and in the case where the degree of similarity between the two directions described above is high, a value close to 1 is set and in the case where the degree of similarity is low, a value close to 0 is set. In the present embodiment, an example is shown in which as the degree of similarity of direction, the inner product of two direction vectors is used, but the calculation method of the degree of similarity is not limited to the above and it may also be possible to calculate the degree of similarity by any expression.

$$E = G \cdot D \quad \text{expression(18)}$$

The calculation method of the degree of difference of direction is not limited to the above and it may also be possible to calculate the degree of difference of direction by any expression.

In the present embodiment, among the disparity images other than the base image, the disparity image whose evaluation value E calculated by the evaluation value calculation unit 504' is the largest is used as the reference image. The larger the evaluation value E, the higher the degree of similarity between the direction of the luminance gradient and the direction of the epi-polar line becomes and the larger the change in luminance in the search range becomes. Because of this, the change in the degree of difference at the time of block matching within the search range becomes large and the degree of similarity has a clear peak, and therefore, it is made possible to search for a correct corresponding point. Because of this, in the case where a plurality of cameras is set at arbitrary positions and in arbitrary attitudes and a disparity image is captured, despite the existence of a luminance gradient and an edge, such as a line, on the epi-polar line, it is possible to reduce the influence thereof and it is possible to highly accurately estimate a distance.

In the present embodiment, the degree of similarity between the direction of the luminance gradient and the direction of the epi-polar line is calculated as an evaluation value, but it may also be possible to calculate the degree of difference between the direction of the luminance gradient and the direction of the epi-polar line as an evaluation value. Further, as the degree of difference between the direction of the luminance gradient and the direction of the epi-polar line, it is possible to use, for example, the angle formed by the direction of the luminance gradient and the direction of the epi-polar line. In this case, among the disparity images other than the base image, the disparity image whose calculated degree of difference is the smallest is used as the reference image.

Third Embodiment

In the first embodiment and the second embodiment, based on the evaluation value, one disparity image is selected as the reference image for distance calculation, but in the present embodiment, the number of reference images is not limited to one and a distance is calculated by using all the disparity images other than the base image as the reference images. Further, in the present embodiment, a distance is calculated by using each disparity image with a weight in accordance with the evaluation value.

A reference image determination unit 304', a corresponding point search unit 305', and a distance calculation unit 306' of the present embodiment, whose operations are different from those of the reference image determination unit 304, the corresponding point search unit 305, and the distance calculation unit 306 of the first embodiment, are explained. In the present embodiment, the number of reference images is not limited to one, but a distance is calculated by using all the disparity images other than the base image as the reference images. The reference image determination unit 304' of the present embodiment determines a weight of each disparity image for distance calculation. Specifically, an evaluation value utilization unit 505' in the reference image determination unit 304' determines a weight of the evaluation-target image in accordance with an evaluation value calculated by the evaluation value calculation unit 504'. Further, the corresponding point search unit 305' in the present embodiment searches for the corresponding point of the pixel of interest of the base image also for all the disparity images other than the base image. The distance calculation unit 306' in the present embodiment calculates a distance to a subject by using the search results of the corresponding point in all the disparity images other than the base image based on the weight determined by the reference image determination unit 304'.

Further, the image processing apparatus 100 in the present embodiment performs the processing in accordance with the flowchart shown in FIG. 4 as in the first embodiment, but the processing at step S405 to step S407 is different. In the following, step S405' to step S407' in the present embodiment are explained. The processing contents at the other steps are same as those of the first embodiment, and therefore, explanation is omitted.

As step S405', the reference image determination unit 304' calculates an evaluation value of each disparity image other than the base image as the reference image determination unit 304 of the first embodiment does. Then, in accordance with the calculated evaluation value, the weight of each disparity image is determined. The total value of the weight of each disparity image becomes 1. It may also be possible to determine the weight of each disparity image as a value in proportion to the evaluation value or to determine the weight by another method. Further, it may also be possible to set the weight of part of the disparity images to 0 in accordance with the evaluation value. For example, the weight of the disparity image whose evaluation value is lower than or equal to a predetermined value is set to 0. At step S406', the corresponding point search unit 305' searches for the corresponding point of the pixel of interest of the base image for all the disparity images other than the base image. It is possible to search for the corresponding point in each disparity image by block matching using the degree of difference as in the first embodiment.

At step S407', the distance calculation unit 306' calculates a distance to a subject by using all the disparity images other than the base image. Specifically, a weighted average of the distance calculated by solving simultaneous equations of expression (5) and expression (6), respectively, from the corresponding point search results of each disparity image is calculated. At this time, as the weight for the distance calculated in each disparity image, the weight determined at step S405' is used.

An evaluation value is calculated from the magnitude and direction of the luminance gradient on the epi-polar line and the evaluation value is made use of for the calculation of the distance to a subject, but there is a case where an error occurs in the evaluation value due to noise and the like at the time of calculating the evaluation value of the magnitude and angle of the luminance gradient. Because of this, in the case where one reference image is used as in the first and second embodiments, there is a possibility that the effects cannot be obtained sufficiently due to the error that occurs in the evaluation value. In the present embodiment, by calculating the distances from all the cameras to a subject and by using the evaluation value as the weight of the weighted average, it is possible to reduce the influence of the error in the evaluation value due to noise and the like. Because of this, it is made possible to reduce the influence in the case where a luminance gradient and an edge, such as a line, exist on the epi-polar line.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Further, in the embodiment described previously, the example is explained in which selection of the reference image or determination of the weight of the reference image is performed for each pixel of the base image, but the example is not limited to this and it may also be possible to select the reference image or determine the weight of the reference image for each predetermined-sized area.

In the image processing apparatus of the present invention, in the case where a plurality of cameras set at arbitrary positions and in arbitrary attitudes is used, it is possible to reduce the influence of a luminance gradient and an edge, such as a line, of a subject and to highly accurately acquire three-dimensional information on the subject.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-162808 filed Aug. 23, 2016, which is hereby incorporated by reference wherein in its entirety.

What is claimed is:

1. An image processing apparatus that calculates three-dimensional information on a subject by a corresponding point search by taking one of three or more disparity images including the common subject to be a base image and one of the disparity images other than the base image to be a reference image, the image processing apparatus comprising:
    one or more processors; and
    one or more memories including instructions stored thereon that, when executed by the one or more processors, cause the image processing apparatus to:
        determine an image to be used as the reference image out of the disparity images other than the base image based on an evaluation value in relation to a luminance gradient on an epi-polar line calculated from a base station in each of the disparity images other than the base image; and
        search for a corresponding point in the base image and the determined reference image.

2. The image processing apparatus according to claim 1, wherein the one or more memories has further instructions stored thereon which, when executed by the one or more processors, cause the image processing apparatus to
    perform determination for each pixel of the base image.

3. The image processing apparatus according to claim 1, wherein the one or more memories has further instructions stored thereon which, when executed by the one or more processors, cause the image processing apparatus to
    to calculate the evaluation value in relation to a luminance gradient on the epi-polar line.

4. The image processing apparatus according to claim 3, wherein the one or more memories has further instructions stored thereon which, when executed by the one or more processors, cause the image processing apparatus to
    calcualte a value representing a magnitude of a luminance gradient on the epi-polar line as the evaluation value.

5. The image processing apparatus according to claim 3, wherein the one or more memories has further instructions stored thereon which, when executed by the one or more processors, cause the image processing apparatus to
    calculate a value representing a degree of similarity between a direction of a luminance gradient on the epi-polar line and a direction of the epi-polar line as the evaluation value.

6. The image processing apparatus according to claim 3, wherein the one or more memories has further instructions stored thereon which, when executed by the one or more processors, cause the image processing apparatus to
    calculate an angle formed by a direction of a luminance gradient on the epi-polar line and a direction of the epi-polar line as the evaluation value.

7. The image processing apparatus according to claim 3, the one or more memories has further instructions stored thereon which, when executed by the one or more processors, cause the image processing apparatus to
    limit a search range, for each pixel of the base image, based on results of a search of a corresponding point of a pixel adjacent to the pixel, wherein
    the evaluation value is calculated in relation to a luminance gradient on the epi-polar line in the search range.

8. The image processing apparatus according to claim 1, wherein the three-dimensional information is a distance from a camera that captures the base image to the subject.

9. An image processing method of calculating three-dimensional information on a subject by a corresponding point search by taking one of three or more disparity images including the common subject to be a base image and one of the disparity images other than the base image to be a reference image, the method comprising:
- determining an image to be used as the reference image out of the disparity images other than the base image based on an evaluation value in relation to a luminance gradient on an epi-polar line calculated from a base station in each of the disparity images other than the base image; and
- searching for a corresponding point in the base image and the determined reference image.

10. A non-transitory computer readable storage medium storing a program for causing a computer to execute an image processing method of calculating three-dimensional information on a subject by a corresponding point search by taking one of three or more disparity images including the common subject to be a base image and one of the disparity images other than the base image to be a reference image, the method comprising:
- determining an image to be used as the reference image out of the disparity images other than the base image based on an evaluation value in relation to a luminance gradient on an epi-polar line calculated from a base station in each of the disparity images other than the base image; and
- searching for a corresponding point in the base image and the determined reference image.

* * * * *